(12) United States Patent
Borg

(10) Patent No.: US 7,973,971 B1
(45) Date of Patent: Jul. 5, 2011

(54) GRAY COMPONENT REPLACEMENT IN COLOR CONVERSIONS

(75) Inventor: Lars U. Borg, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 651 days.

(21) Appl. No.: 12/040,526

(22) Filed: Feb. 29, 2008

(51) Int. Cl.
*H04N 1/40* (2006.01)

(52) U.S. Cl. ........................................ 358/2.1; 358/504

(58) Field of Classification Search ................. 358/1.9, 358/2.1, 500, 504, 515, 518, 520, 522–523, 358/529–530; 348/234, 254; 345/604
See application file for complete search history.

(56) References Cited

U.S. PATENT DOCUMENTS

| 5,398,120 A * | 3/1995 | Friedman et al. | 358/501 |
| 5,491,568 A * | 2/1996 | Wan | 358/518 |
| 6,084,689 A | 7/2000 | Mo | |
| 6,160,644 A * | 12/2000 | Lin | 358/518 |
| 6,181,445 B1 * | 1/2001 | Lin et al. | 358/520 |
| 7,050,627 B2 | 5/2006 | Cuciurean-Zapan et al. | |
| 7,259,893 B2 | 8/2007 | Falk et al. | |
| 7,269,297 B2 | 9/2007 | Loce et al. | |
| 7,411,696 B2 | 8/2008 | Maltz | |
| 7,729,014 B2 | 6/2010 | Falk et al. | |
| 2007/0153308 A1 | 7/2007 | Zemach et al. | |
| 2008/0080023 A1 | 4/2008 | Sato | |

* cited by examiner

*Primary Examiner* — Thomas D Lee
*Assistant Examiner* — Stephen M Brinich
(74) *Attorney, Agent, or Firm* — Fish & Richardson P.C.

(57) ABSTRACT

A method includes receiving a first value in a first color space for conversion to a second value in a second color space. The first color space includes luminance, chroma, and hue components and the second includes black and multiple color components. The method includes identifying a color gamut limit of the second color space and determining multiple boundaries in the first color space corresponding to the limit. The method also includes identifying gray and saturation levels associated with first value based on a relationship of the luminance and chroma components and the boundaries. The method includes determining a black component value in the second color space using the identified gray level and the identified saturation level. The method also includes determining the second color value in the second color space using the black component value and the first value.

22 Claims, 5 Drawing Sheets

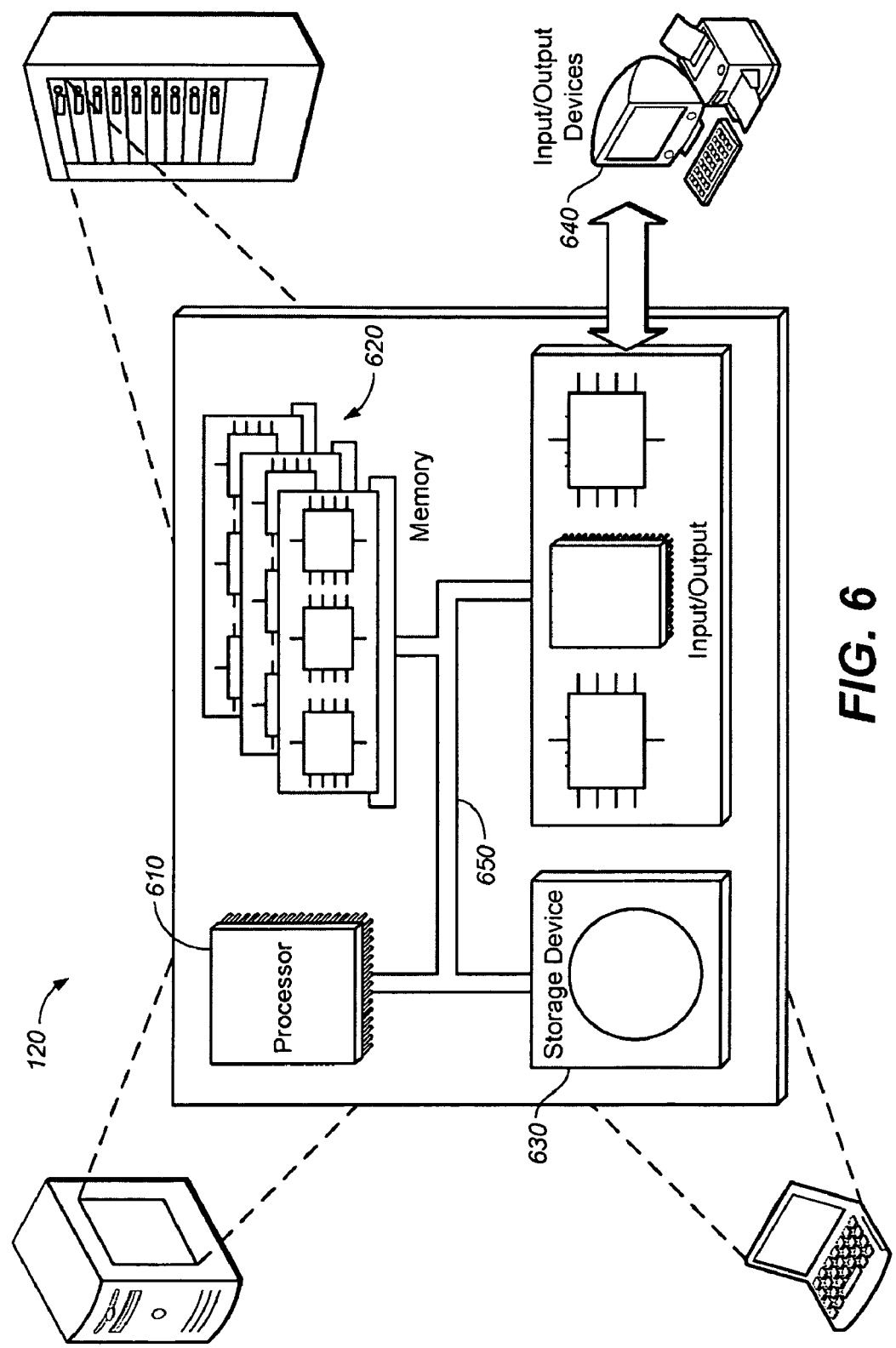

GRAY COMPONENT REPLACEMENT IN COLOR CONVERSIONS

BACKGROUND

The present disclosure relates to the field of data processing, and more specifically to gray component replacement in color conversions.

Digital devices that create (e.g., scanners and digital cameras), display (e.g. CRT and LCD monitors), or print (e.g. ink-jet and laser printers) colors typically define color data using color spaces. Generally, a color space is a combination of a color model and a gamut. A color model defines each color within the model using primary components, such as, in the case of a Red, Green, Blue (RGB) color model, the levels of red, green, and blue light components needed to create each color, or in the case of a Cyan, Magenta, Yellow, and Key (CMYK) color model, the levels of cyan, magenta, yellow, and black ink needed to create each color. Some color models use primary components that are not primary colors, but are more abstract, such as the CIE XYZ color space. Levels of each component in the color models typically range from 0 to 100 percent of full intensity, which may be represented on a scale of 0 to 1. By varying the levels or intensities of the primary components, various colors in the color model may be created. However, as a practical matter a device is often limited in its ability to produce pure cyan, magenta, or yellow ink, which limits its range of colors or color gamut. A gamut is simply the range of colors that may be displayed on, rendered by, or captured by a particular device.

Each device, depending on its limitations and definitions for pure primary colors, may have a different color gamut and color spaces. To facilitate rendering the same color in two different color spaces such that the color appears substantially the same in both color spaces, conversion methods may be performed. Converting from one device-dependent color space to another is often accomplished through an intermediary device-independent color space, which define colors in more absolute terms. Some examples of device-independent color spaces include the CIE XYZ. CIE L*a*b* (luminance, a, b), and CIE LCH (luminance, chroma, hue) color spaces. The relationship of a device's native color space with a device-independent color space typically is described by some combination of formulas, transfer functions, matrices, and look up tables. This relationship may be stored in an International Color Consortium (ICC) profile for the device. Methods to convert among the various device-independent color spaces are well known in the art.

SUMMARY

This specification describes technologies relating to gray component replacement in color conversions.

In some embodiments, systems and methods, including computer software products, for gray component replacement in color conversions involve receiving a first color value in a first color space for conversion to a second color value in a second color space, the first color value comprising a luminance component, a chroma component, and a hue component, the second color value comprising a black component and a plurality of color components. A limit of a color gamut in the second color space is determined. At least a portion of the limit corresponds to a range of color values representing a substantially darkest portion of the color gamut. A first boundary in the first color space corresponding to color values in the second color space associated with the range of color values representing the substantially darkest portion of the color gamut is identified. A gray level associated with the first color value based on a relationship of the luminance component and the chroma component to the first boundary is identified. A black component value in the second color space using the identified gray level is determined. The second color value in the second color space corresponding to the first color value in the first color space using the black component value and the first color value in the first color space is determined.

In some other embodiments, systems and methods, including computer software products, for gray component replacement in color conversions involve receiving a first color value in a first color space for conversion to a second color value in a second color space. The first color value includes a luminance component, a chroma component, and a hue component. The second color value includes a black component and a plurality of color components. A limit of a color gamut in the second color space is identified. A plurality of boundaries in the first color space corresponding to the limit of the color gamut in the second color space is determined. A gray level and a saturation level associated with the first color value is identified based on a relationship of the luminance component and the chroma component and the plurality of boundaries. A black component value in the second color space is determined using the identified gray level and the identified saturation level. The second color value in the second color space corresponding to the first color value in the first color space is determined using the black component value and the first color value in the first color space.

These and other embodiments can optionally include one or more of the following features. At least a portion of the limit can correspond to color values associated with the hue component across a range of color values representing the substantially darkest portion of the color gamut. At least a portion of the limit can correspond to a range of color values representing a substantially lightest portion of the color gamut. The embodiments can also involve identifying a second boundary in the first color space corresponding to color values in the second color space associated with the range of color values representing the substantially lightest portion of the color gamut. Identifying a gray level associated with the first color value can include identifying a gray level based on a relationship of the luminance component and the chroma component to the first and second boundaries. At least a portion of the limit can correspond to color values associated with the hue component across a range of color values representing the substantially lightest portion of the color gamut. At least a portion of the limit can correspond to a range of color values representing a substantially most saturated portion of the color gamut. At least a portion of the limit can correspond to a range of color values representing a substantially least saturated portion of the color gamut. The embodiments can also involve identifying a third boundary in the first color space corresponding to color values in the second color space associated with the range of color values representing the substantially most saturated portion of the color gamut; identifying a fourth boundary in the first color space corresponding to color values in the second color space associated with the range of color values representing the substantially least saturated portion of the color gamut. Identifying the gray level associated with the first color value can include identifying the gray level based on a relationship of the luminance component and the chroma component to the first, second, third, and fourth boundaries.

At least a portion of the limit can correspond to color values associated with the hue component across a range of color values representing the substantially most saturated portion of the color gamut. Identifying the gray level associated with the first color value can include determining a ratio of a first distance from the first color value to the second boundary to a second distance from the first boundary to the second boundary, the first and second distances determined based on the first color value and a value determined from the color value from an intersection of extrapolations of the third and the fourth boundaries. Identifying the saturation level associated with the first color value can include determining a ratio of a third distance from the first color value to the fourth boundary to a fourth distance from the third boundary to the fourth boundary, the third and fourth distances determined based on the first color value and a value determined from the color value from an intersection of extrapolations of the first and the second boundaries.

The second color space can include a Cyan, Magenta, Yellow, Key (CMYK) color space. The first color space can include one of a International Commission on Illumination (CIE) Luminance, Chroma, Hue (LCH) color space, a Hue, Saturation, Value (HSV) color space, a Hue, Saturation, Brightness (HSB) color space, or a Hue, Saturation, Lightness (HSL) color space.

Determining the black component value in the second color space can include using the identified gray level, the identified saturation level, and a chroma start value. The chroma start value can be a constant or based on the hue component.

Particular embodiments of the subject matter described in this specification can be implemented to realize one or more of the following advantages. Ink reduction can be maximized without loss of saturation or gamut, possibly up to 66% ink savings. Also, black dots may be eliminated in pure yellow printed areas, sometimes while still providing aggressive ink reductions in all other colors. Banding artifacts caused by high slopes in conventional gray component replacement (GCR) methods can be minimized. The printable gamut, especially in shadow areas, can also be maximized. None, some, or all of these benefits may be present in various embodiments.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 6 illustrates an example a processing machine that can be used with the system of FIG. 1.
Like reference numbers and designations in the various drawings indicate like elements.

DETAILED DESCRIPTION

Figure 1:
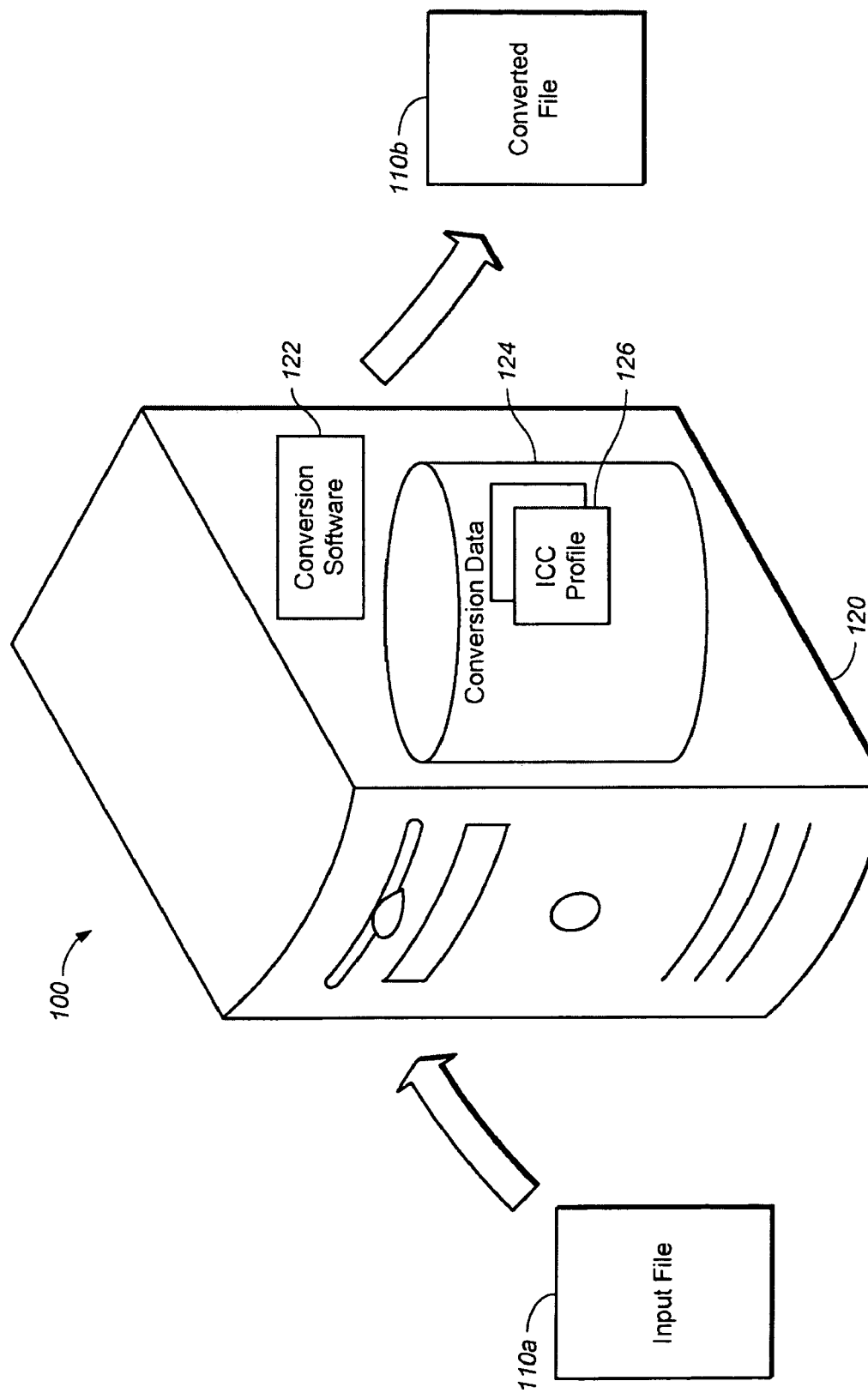
FIG. 1 is a block diagram of a color conversion system.

Image processing work flows often require the conversion of files from one color space to another, such as from a three color component model like a Red, Green, Blue (RGB) color model to a four component model like the Cyan, Magenta, Yellow, and Key (CMYK) color model. For example, a desktop publishing file may be created and edited using a desktop publishing software program that consistently used a source RGB color space defined by a first International Color Consortium (ICC) profile. That file may then be sent to a printing press that uses destination CMYK color space defined by a second ICC profile. In order to print the desktop publishing file in a way that preserves the intended color, the printing press may convert the file from the source color space to the destination color space using the ICC profiles.

The conversion from a three color component space to a four color component space introduces some redundancy. That is, the fourth color component carries information that may be conveyable using the other three components. This can be seen more clearly in the example of the CMYK color space, where the cyan, magenta, and yellow components are the primary components that can be added in varying intensities to produce many colors in the gamut. For example, a dark gray color can be produced by mixing equal intensities of the cyan, magenta, and yellow components. The black (K) component, however, may also be used alone to produce the same dark gray color. In this case, the black component ink "replaces" the ink of the cyan, magenta, and yellow components. The same dark gray color may be created using a mix of all four component inks. Similarly, other non-gray colors may be rendered using varying amounts of black ink. Thus, a color value in an RGB color space can be represented in a number of ways in a CMYK color space by using the varying intensities of the black component ink to replace some or all of the combined cyan, magenta, and yellow component inks. Notwithstanding, once the value of the black component is identified, the cyan, magenta, and yellow component values are determinable for a corresponding RGB color value.

Techniques can be implemented to identify a black component value when converting a color value from a color space having luminance, saturation, and hue components (e.g., CIE LCH, HSV, and HSB) to a color space having multiple color components and a black component (e.g., CMYK and CcMmYK). In general, a first color value in a source color space having luminance, chroma/saturation, and hue components (e.g., CIE LCH) is converted to a second color value in a destination color space having multiple color components and a black component (e.g., CMYK). Based on the hue component or hue angle, a gray level can be identified based on the relative distance the first color value is from the brightest colors at the hue angle relative to the darkest colors at the hue angle. Also based on the hue angle, a saturation level can be determined based on the relative distance of the first color value from the least saturated colors (gray colors) relative to the most saturated colors at the hue angle. A black component value in the second color space can be determined from the gray level or a combination of the gray level and saturation level. Based on the black component value and the first color value, the other multiple color components can be determined.

Benefits of some embodiments include maximizing ink reduction without loss of saturation or gamut, possibly up to 66% ink savings. Also, black dots may be eliminated in pure yellow printed areas, sometimes while still providing aggressive ink reductions in all other colors. Another benefit may be minimizing banding artifacts caused by high slopes in conventional gray component replacement (GCR) methods. Also, a benefit may be maximizing the printable gamut, especially in shadow areas. None, some, or all of these benefits may be present in various embodiments.

As shown in FIG. 1, a color conversion system 100 includes a processing machine 120 that receives an input file 110 having colors expressed in a source color space and transmits a converted file 110b having colors expressed in a destination color space. The processing machine 120 includes conversion software 122 and conversion data 124 that stores ICC profiles 126. Generally, the conversion software 122 determines for each color value in the input file 110 a corresponding color value in a destination color space that is adjusted based on gray level and/or saturation level. The conversion software 122 may include other functionality such as gamut mapping, transforming the input color values to one or more intermediate color spaces, and applying conversion methods.

Figure 2:
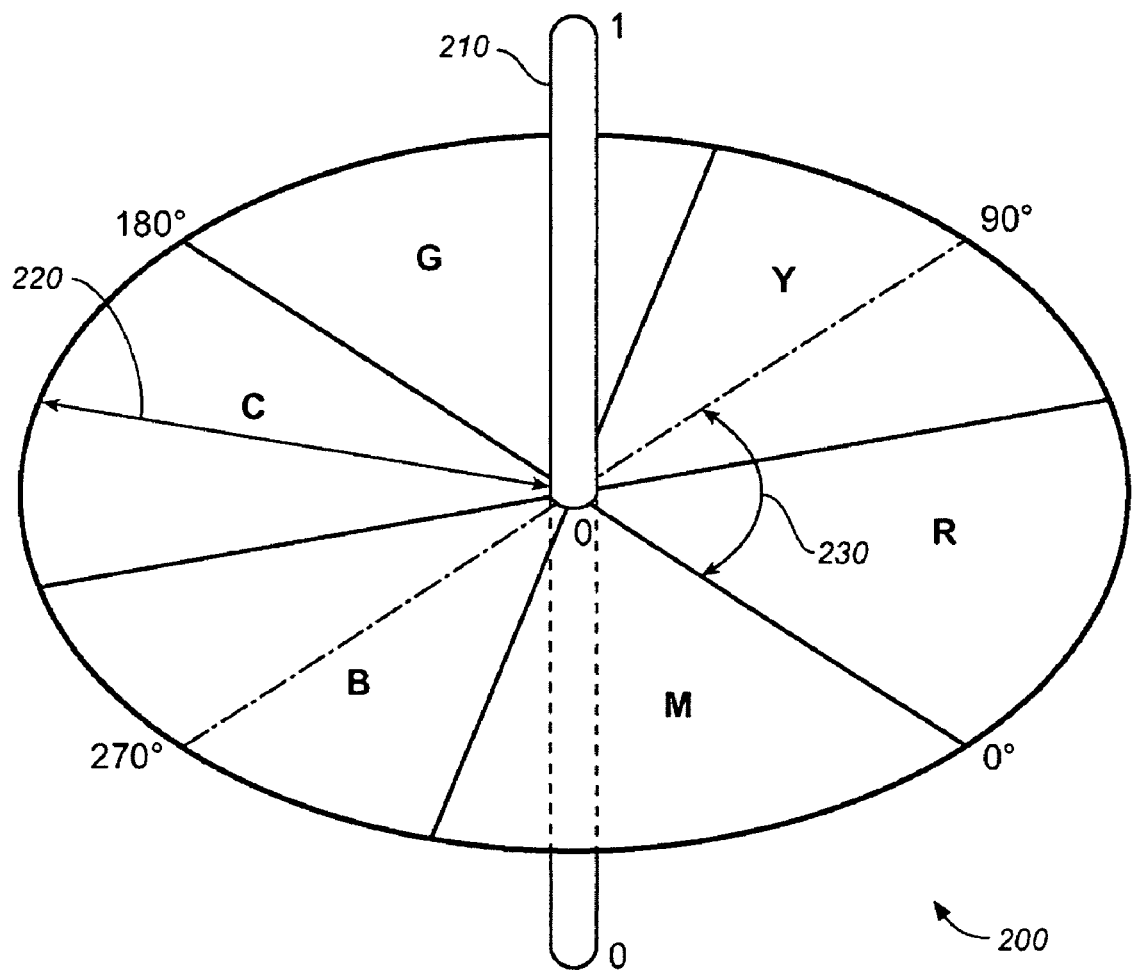
FIG. 2 is an illustration of the CIE LCH color space.

The color values of the input color space may be defined in or converted to a source color space that has luminance, chroma, and hue components, such as the CIE LCH color space. The converted color values may be used to determine the destination color values. The CIE LCH color space is a device-independent color space that expresses color values in terms of polar coordinates. FIG. 2 is an illustration of a CIE LCH color space 200, which is depicted in a three-dimensional polar coordinate system (A similar drawing in color may be found at http://www.colour phil.co.uk/lab_lch_colour_space.html). Color values in this color space are defined by three component values: luminance 210, which expresses the lightness of the color; chroma 220, which expresses the saturation of the color; and hue 230, which expresses the tone of the color. The different sections of the disk labeled M (magenta), R (red), Y (yellow), G (green), C (cyan), and B (blue) represent a smoothly transitioning color gradient. The richest most saturated colors reside on the outermost surfaces of the color space, where chroma is at its maximum intensity, whereas the grayest colors are close to the luminance axis 210, where chroma is at its minimum. Colors having a common hue 230 share the same tone of the color, but may vary in richness (saturation) or brightness (luminance). The least saturated brightest colors at a given hue angle approach white and the least saturated darkest colors at a given hue angle approach black. The range of colors in a color gamut containing the most saturated brightest colors may be referred to as the upper cusp of the color gamut. Similarly, the range of colors in a color gamut containing the most saturated darkest colors may be referred to as the lower cusp of the color gamut.

Turning back to FIG. 1, the input file 110a and converted file 110b (collectively, files 110) each may be any collection of electronic data that includes color data defined in one or more color spaces. The input file 110a generally includes color data in an input color space and the converted file 110b generally includes color data in a destination color space. The files 110 may also include other data, such as text, embedded fonts, images and 2D vector graphics data (data in addition to related color data), digital rights management information, and other types of non-color data. The files 110 may adhere to a given specification or format, including, for example, Extensible Markup Language Paper Specification (XPS), portable document format (PDF), Joint Photographic Experts Group (JPEG), Tagged Image File Format (TIFF), and Portable Network Graphics (PNG) file formats. The input color space may be based on any of a variety of color models, such as RGB, CMYK, YCrCb, CIE Lab, CIE LCH, and many others. The input color values may be converted to color values in an LCH source color space. The destination color space may be based on any of a variety of color models and color spaces that include a black component, such as, for example, CMYK and CcMmYK. The input file 110 may also include an ICC profile that defines the color space or color spaces used within the file.

The processing machine 120 is any apparatus, device, or combination of machines for processing data, including, for example, a programmable processor, a computer, or multiple processors or computers. The processing machine 120 can include, in addition to hardware, code that creates an execution environment for the computer program in question, e.g., code that constitutes processor firmware, a protocol stack, a database management system, an operating system, or a combination of one or more of them. The processing machine 120 includes color conversion software 122 and conversion data 124.

Generally, the color conversion software 122 may be a computer program that is executed by the processing machine 120 to facilitate color conversion. A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one processing machine 120 or on multiple processing machines 120 that are located at one site or distributed across multiple sites and interconnected by a communication network.

The conversion data 124 facilitates the transformation of color data from the input/source color space to destination color space of the converted file 110b. The conversion data 124 may be described in a table, a matrix, a formula, a flat file, a lookup table, a computer program, or any combination of these. The conversion data 124 may describe or embody any type of processing that is usually associated with color conversion. The processing may be a single step or a series of steps that may utilize any combination of formulas, matrices, or look up tables. The conversion data 124 may include one or more ICC profiles 126. Generally, an ICC profile 126, associated with a particular color space, is a file that contains information for converting color values from the particular color space to another, usually device-independent, color space and vice-versa.

In operation, the processing machine 120 receives input file 110a and executes the color conversion software 122. The input file 110a may be received from memory, a storage device, or input from a network or an input device. The color data in input file 110a can be defined in virtually any color space. The color data, if not already in a color space having luminance, chroma/saturation, and hue components (LCH color space), can be converted to this type of color space. The conversion of the color data to an LCH color space may involve multiple steps. For example, to convert from a device-dependent RGB color space to the CIE LCH color space may involve first using the ICC profile to convert the RGB color values to the CIE Lab color values. The CIE Lab color values may then be converted to CIE LCH color values using methods known in the art.

When converting between color spaces, the limits of the color gamut in the destination color space can be determined for each source color value in order to identify boundaries in the LCH color space, which are used to calculate a gray level and saturation level of the source color value. The gray and saturation levels can be used to determine a black component value of the destination color value to further facilitate converting the source color value to the destination color value. There are a variety of ways by which to determine the boundaries in the LCH color space that correspond to the limits of the gamut of the destination color space at a particular hue.

One example is constructing a lookup table that contains color values in the upper cusp and color values in the lower cusp stored with each color value's corresponding hue in the source LCH color space. The upper and lower cusps are the most saturated colors in the brightest and darkest areas of the color gamut. The most saturated color values in a CMYK color space are values where one of the primary color components is at its maximum intensity and at least one primary color component is at its minimum intensity. Thus, at most two primary color components are mixed at any given time. When three primary color components are mixed together, the resulting color becomes more gray and thus less saturated.

One range of colors of the upper cusp may be determined by keeping the black component at a minimum value (e.g., zero), the cyan component at a maximum value (e.g., one), the magenta component at a minimum value, and varying the yellow component across all possible values. Other ranges of colors at the upper cusp may be found similarly by keeping the black component value and one of the primary color component values at the minimum value, keeping another primary color component value at the maximum value, and varying the intensity of the other primary color component. The lower cusp may be determined similarly except the black component value is maintained at its maximum intensity. This method applied for each combination of primary color components produces every hue of the CMYK color space. The component that is varied in each iteration could be varied by a fixed amount to create a gradient of the various hues. Each color value can be converted to the LCH color space to determine its corresponding hue angle. Both the color value and its corresponding hue angle can be stored in a lookup table. The table may be used to identify the most saturated brightest and darkest color values given the corresponding hue angle of the source color value. The table may be generated before or during the conversion process. Other methods may also be used to derive the most saturated brightest and darkest colors for a given hue angle.

The most saturated brightest and darkest colors in the destination color space at the particular hue angle may be converted to the LCH color space, along with pure white and pure black using the ICC profiles. The color values of these four colors may be used to determine gamut boundaries in the LCH color space from which to identify a gray level and a saturation level associated with the source color value. The gray level of a color is the relative darkness of that color as measured along a continuum from the brightest colors to the darkest colors. That is, as a color gets darker, its gray level increases. The saturation level of a color is the relative saturation of that color as measured along a continuum from the grayest or least saturated colors to the richest or most saturated colors. The gray level and the saturation level may be calculated as ratios of the distance from one extreme divided by the total distance between the extremes. For example, if a color value is 2 units from the lightest colors and the total distance from the lightest to the darkest colors is 10 units, then the gray level for the color would be 0.2 (i.e., 2/10).

Figure 3:
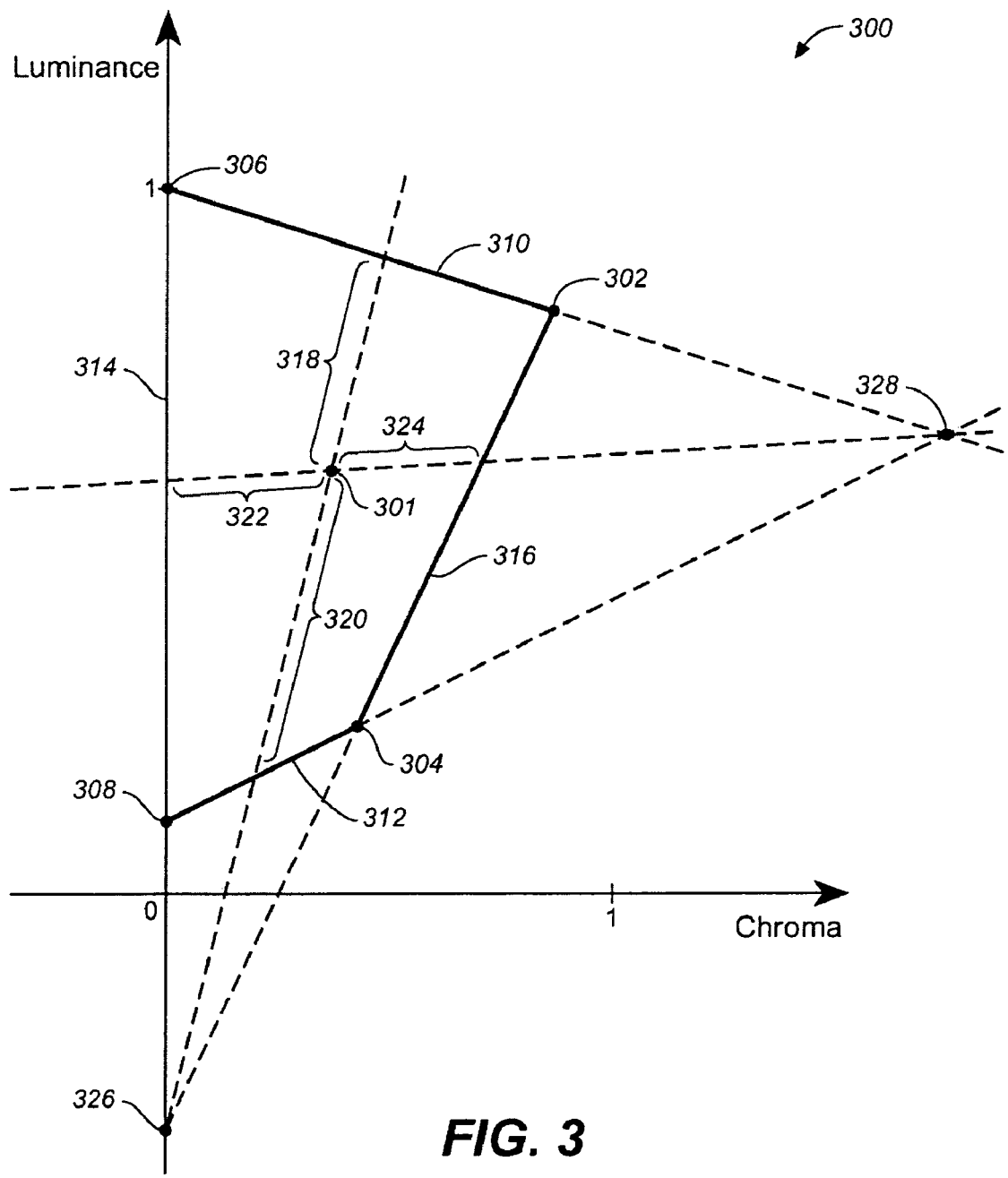
FIG. 3 is a graph corresponding to the gamut of the destination color space at a particular hue angle.

FIG. 3 depicts a graph 300 that corresponds to the gamut of the destination color space at a particular hue angle. Though the hue angle is constant, the luminance component varies along the vertical axis and the chroma component varies along the horizontal axis. Point 301 represents the source color value in the LCH color space. The other points 302, 304, 306, and 308 represent the LCH color values that correspond to the boundaries of the color gamut of the destination color space (e.g., CMYK) at the particular hue angle.

Point 302 corresponds to the most saturated brightest color value in the color gamut of the destination color space at the particular hue angle. It is the point on the upper cusp of the color gamut having the particular hue. Similarly, point 304 corresponds to the most saturated darkest color value in the destination space at the particular hue angle. Points 306 and 308 correspond respectively to the brightest white and the darkest black points in the destination color space. Boundary 310, substantially corresponding to the brightest colors of varying saturation of the particular hue in the destination color gamut, can be determined by connecting the white point 306 and the most saturated bright color point 302. Similarly, boundary 312, substantially corresponding to the darkest colors of varying saturation of the particular hue in the destination color gamut, can be determined by connecting the black point 308 to the most saturated dark point 304. Boundary 316 substantially corresponds to the range of the most saturated colors of varying lightness in the destination color gamut at the particular hue angle. Boundary 314 corresponds to the range of the least saturated (e.g., gray) colors in the destination color gamut. Points 306 and 308 and boundary 314 may be constant regardless of the hue angle, whereas the other points and boundaries may change depending on the hue.

Using the boundaries, a gray level associated with the source color value 301 may be determined. The gray level may be defined as the ratio of the distance of a point from the brightest colors boundary 310 to the total distance from the brightest colors boundary 310 to the darkest colors boundary 312. The line used to measure distances may be determined using point 301 and point 326, which is the point of intersection of the lines containing boundary 314 and boundary 316. The distances 318 (from point 301 to boundary 310) and 320 (from point 301 to boundary 312) can measured along the line defined by points 301 and 326. The total distance can be determined by adding distances 318 and 320. For example, where the distance 318 is 3 units and the distance 320 is 7 units, the gray level can be determined as 3/(3+7) or 0.3.

Similarly, a saturation level associated with the source color value 301 may be determined using the boundaries. The saturation level may be defined as the ratio of the distance of a point from the least saturated colors (gray colors) boundary 314 to the total distance from the least saturated colors boundary 314 to the most saturated colors boundary 316. The line used to measure distances may be determined using point 301 and point 328, which is the intersection of the lines containing boundary 310 and boundary 312. The distances 322 (from point 301 to boundary 314) and 324 (from point 301 to boundary 316) can be measured along the line defined by points 301 and 328. The total distance from boundary 314 to boundary 316 can be determined by adding distances 322 and 324.

To determine the black component of the destination color value using both the gray and the saturation levels, the gray and the saturation levels may be combined into a single parameter using the following formula:

$$combo = gray + saturation \times (1-gray) \times (blackStart - chromaStart) \div (1 - chromaStart)$$

The blackStart parameter is the maximum value among the non-black color component values for gray colors where the black component value begins to have a value greater than zero. The chromaStart parameter is the maximum value among the non-black color components for fully saturated colors where the black component value is desired to begin to have a value greater than zero. Methods for determining the blackStart value are known in the art and may be calculated from a conventional gray component replacement function. For example, in a CMYK color space, blackStart may be defined such that black ink may not be added until one of the cyan, magenta, or yellow components reaches a certain level, such as 30% of maximum intensity. The chromaStart parameter may be hue dependent, a constant, or dependent on some other variable. For example, the chromaStart may be relatively low for saturated dark blue colors, but relatively high for saturated yellow colors.

The gray level may be used alone or in combination with the saturation level to calculate a black component amount to be used in the color value when the source color value is converted to destination color. Methods for determining a black component from a gray level are known in the art. The combination parameter that combines the gray and the saturation levels can be substituted for the gray level in conventional gray component replacement methods.

Once the black component is known for the destination color value, the other color component values (e.g., cyan, magenta, and yellow components in a CMYK destination color space) may be determined from the source color value.

Figure 4:
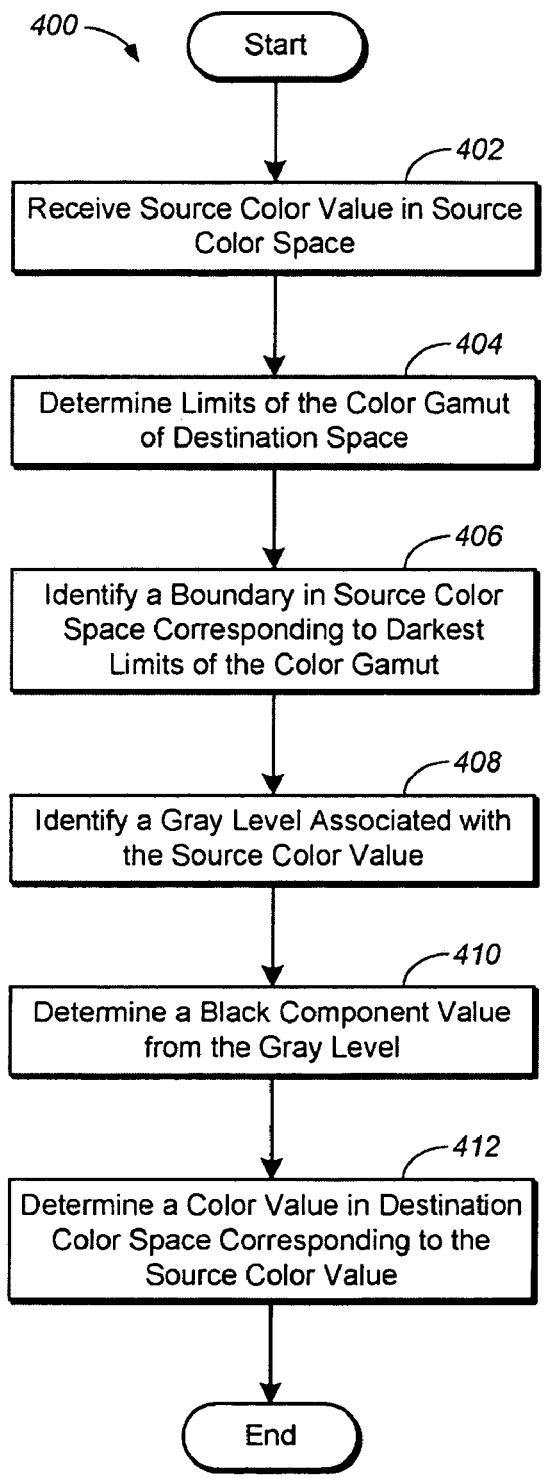
FIG. 4 is a flow chart illustrating a process for converting a color value using a gray level identified based on a boundary of the darkest colors.

FIG. 4 is a flow chart illustrating a process 400 for converting a source color value to a destination color space that has a black component and multiple color components using a gray level determined based on a boundary of the darkest colors. At 402, a source color value in a source color space is received. The source color space can be a color space that has luminance, chroma, and hue (LCH) components. The source color value may have been derived from a color value in a color space that does not have LCH components, such as an RGB or the CIE Lab color spaces. At step 404, the limits of the color gamut of the destination can be determined. These limits can be associated with the darkest and brightest colors of the destination color gamut. The limits can be associated also with a range of colors sharing a common hue, specifically the hue of the source color value. The limits can, in some embodiments, include the points at each extreme, such as pure white, pure black, the brightest most saturated color value at the hue angle of the source color value, and the darkest most saturated color value at the hue angle of the source color value. At 406, boundaries in the source space corresponding to the darkest colors of the destination color gamut can be identified. Other boundaries, for example a boundary corresponding to the brightest colors and one corresponding to the least saturated colors, can also be determined. At 408, a gray level associated with the source color value can be identified based on the boundaries. One way of identifying a gray level is by determining the source color value's proximity to the boundary corresponding to the darkest colors. The gray level can increase as the source color value approaches the boundary of darkest colors. The proximity can be measured also as a ratio of the distance the source color value is from the boundary corresponding to the brightest colors to the distance the boundary of darkest colors is from the boundary of brightest colors.

At step 410, a black component value of the destination color value in the destination color space can be determined from the gray level. Conventional methods for gray component replacement can be used to derive the black component value from the given gray level. At 412, the remaining color components of the destination color value can be determined. These other color component values can be derived using methods known in the art for converting color values to a destination color space that has a black component value, such as CMYK, using the black component value and the source color value.

Figure 5:
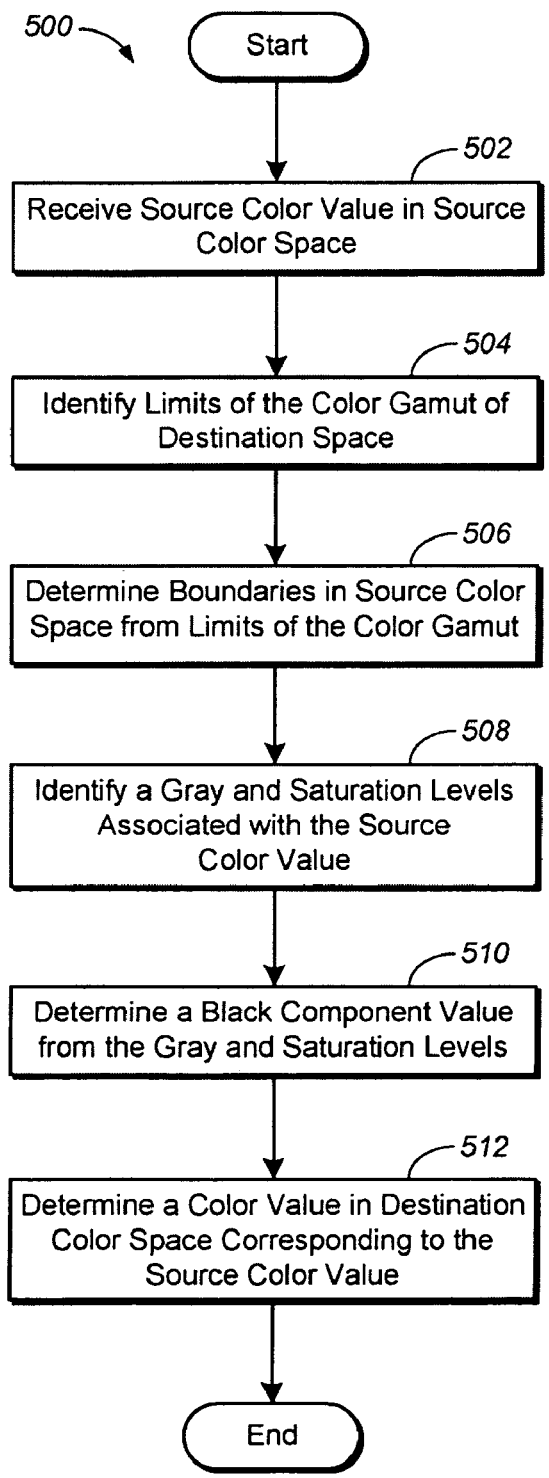
FIG. 5 is a flow chart illustrating a process for converting a color value using a gray level and a saturation level.

FIG. 5 is a flow chart illustrating a process 500 for converting a source color value to a destination color space that has a black component and multiple color components using a gray level and a saturation level. At 502, a source color value in a source color space is received. The source color space can be a color space that has LCH components. The source color value may have been derived from a color value in a color space that does not have LCH components. At step 504, the limits of the color gamut of the destination can be determined. These limits can be associated with the darkest and brightest colors of the destination color gamut. The limits can also be associated with a range of colors sharing a common hue, specifically the hue of the source color value. The limits can, in some embodiments, include the points at each extreme, such as pure white, pure black, the brightest most saturated color value at the hue angle of the source color value, and the darkest most saturated color value at the hue angle of the source color value. At 506, boundaries in the source space corresponding to the limits of the destination color gamut can be identified. The boundaries can include, for example, a boundary corresponding to the brightest colors, a boundary corresponding to the darkest colors, a boundary corresponding to the most saturated colors, and a boundary corresponding to the least saturated colors. The boundaries may be determined for the given hue of the source color value. At 508, a gray level and a saturation level associated with the source color value can be identified based on the boundaries. Identifying a gray level may be accomplished by determining the source color value's proximity to the boundary corresponding to the darkest colors. The gray level can increase as the source color value approaches the boundary of darkest colors. The proximity can be measured as a ratio of the distance the source color value is from the boundary corresponding to the brightest colors to the distance the boundary of darkest colors is from the boundary of brightest colors. Identifying a saturation level may be accomplished by determining the source color value's proximity to the boundary corresponding to the most saturated colors. The saturation level can increase as the source color value approaches the boundary of most saturated colors.

At step 510, a black component value of the destination color value in the destination color space can be determined from the gray level and the saturation level. The two levels may be combined into a single value and used in conventional methods for gray component replacement to derive the black component value. At 512, the remaining color components of the destination color value can be determined. These other color component values can be derived using methods known in the art for converting color values to a destination color space that has a black component value, such as CMYK, using the black component value and the source color value.

FIG. 6 illustrates an example processing machine 120. In general, the processing machine 120 includes a processor 610, memory 620, storage device 630, input/output devices 640, and communications bus 650, which allows the other devices to communicate with one another. Input and output devices 640 include any device that may interact with a processing machine 120, such as printers, monitors, keyboards, trackballs, mice, networks, etc.

A processor 610 may be suitable for the execution of a computer program, and includes, by way of example, both general and special purpose microprocessors, and any one or more processors of any kind of digital computer. Moreover, the processor 610 may be embedded in another device, e.g., a mobile telephone, a personal digital assistant (PDA), a mobile audio player, a Global Positioning System (GPS) receiver, a notebook computer, a desktop computer, or a server, to name just a few possible examples. Generally, a processor will be operatively coupled to receive data and/or instructions from, or transfer data to, a memory 620.

The memory 620 and storage device 630 are computer readable media suitable for storing computer program instructions and data. The memory 620 may be any form of volatile or non-volatile memory, media and memory devices, including by way of example semiconductor memory devices, e.g., DRAM, SRAM, EPROM, EEPROM, and flash memory devices. The storage device 630 may be any form of non-volatile memory, such as magnetic disk drives, e.g., internal hard disks or removable disks; magneto optical disk drives; and CD ROM and DVD-ROM disk drives. The processor 610 and the memory 620 can be supplemented by, or incorporated in, special purpose logic circuitry.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:
1. A method comprising:
receiving a first color value in a first color space for conversion to a second color value in a second color space, the first color value comprising a luminance component, a chroma component, and a hue component, the second color value comprising a black component and a plurality of color components;
determining a limit of a color gamut in the second color space, wherein at least a portion of the limit corresponds to a range of color values representing a substantially darkest portion of the color gamut;
identifying a first boundary in the first color space corresponding to the range of color values representing the substantially darkest portion of the color gamut;

identifying a gray level associated with the first color value based on a relationship of the luminance component and the chroma component to the first boundary;

determining a black component value in the second color space using the identified gray level; and determining the second color value in the second color space corresponding to the first color value in the first color space using the black component value and the first color value in the first color space.

2. The method of claim 1 wherein at least a portion of the limit corresponds to color values associated with the hue component across a range of color values representing the substantially darkest portion of the color gamut.

3. The method of claim 1, wherein at least a portion of the limit corresponds to a range of color values representing a substantially lightest portion of the color gamut, the method further comprising identifying a second boundary in the first color space corresponding to color values in the second color space associated with the range of color values representing the substantially lightest portion of the color gamut, and wherein identifying a gray level associated with the first color value comprises identifying a gray level based on a relationship of the luminance component and the chroma component to the first and second boundaries.

4. The method of claim 3, wherein at least a portion of the limit corresponds to color values associated with the hue component across a range of color values representing the substantially lightest portion of the color gamut.

5. The method of claim 3, wherein at least a portion of the limit corresponds to a range of color values representing a substantially most saturated portion of the color gamut, wherein at least a portion of the limit corresponds to a range of color values representing a substantially least saturated portion of the color gamut, and wherein:

the method further comprises:

identifying a third boundary in the first color space corresponding to color values in the second color space associated with the range of color values representing the substantially most saturated portion of the color gamut;

identifying a fourth boundary in the first color space corresponding to color values in the second color space associated with the range of color values representing the substantially least saturated portion of the color gamut; and identifying the gray level associated with the first color value comprises identifying the gray level based on a relationship of the luminance component and the chroma component to the first, second, third, and fourth boundaries.

6. The method of claim 5, wherein at least a portion of the limit corresponds to color values associated with the hue component across a range of color values representing the substantially most saturated portion of the color gamut.

7. The method of claim 5, wherein identifying the gray level associated with the first color value comprises determining a ratio of a first distance from the first color value to the second boundary to a second distance from the first boundary to the second boundary, the first and second distances determined based on the first color value and a value determined from the color value from an intersection of extrapolations of the third and the fourth boundaries.

8. The method of claim 1, wherein the second color space comprises a Cyan, Magenta, Yellow, Key (CMYK) color space.

9. The method of claim 1, wherein the first color space comprises one of an International Commission on Illumination (CIE) Luminance, Chroma, Hue (LCH) color space, a Hue, Saturation, Value (HSV) color space, a Hue, Saturation, Brightness (HSB) color space, or a Hue, Saturation, Lightness (HSL) color space.

10. A method comprising:

receiving a first color value in a first color space for conversion to a second color value in a second color space, the first color value comprising a luminance component, a chroma component, and a hue component, the second color value comprising a black component and a plurality of color components;

identifying a limit of a color gamut in the second color space;

determining a plurality of boundaries in the first color space corresponding to the limit of the color gamut in the second color space;

identifying a gray level and a saturation level associated with the first color value based on a relationship of the luminance component and the chroma component and the plurality of boundaries;

determining a black component value in the second color space using the identified gray level and the identified saturation level; and determining the second color value in the second color space corresponding to the first color value in the first color space using the black component value and the first color value in the first color space.

11. The method of claim 10, wherein at least a portion of the limit of the color gamut in the second color space corresponds to color values associated with the hue component across a range of color values for the color gamut.

12. The method of claim 10, wherein:

at least a portion of the limit corresponds to a range of color values representing a substantially darkest portion of the color gamut;

at least a portion of the limit corresponds to a range of color values representing a substantially lightest portion of the color gamut;

at least a portion of the limit corresponds to a range of color values representing a substantially most saturated portion of the color gamut;

at least a portion of the limit corresponds to a range of color values representing a substantially least saturated portion of the color gamut;

the plurality of boundaries comprises a first boundary in the first color space corresponding to color values in the second color space associated with the range of color values representing the substantially darkest portion of the color gamut, a second boundary in the first color space corresponding to color values in the second color space associated with the range of color values representing the substantially lightest portion of the color gamut, a third boundary in the first color space corresponding to color values in the second color space associated with the range of color values representing the substantially most saturated portion of the color gamut, and a fourth boundary in the first color space corresponding to color values in the second color space associated with the range of color values representing the substantially least saturated portion of the color gamut; and identifying the gray level and the saturation level associated with the first color value comprises identifying the gray level and the saturation level based on a relationship of the luminance component and the chroma component to the first, second, third, and fourth boundaries.

13. The method of claim 12, wherein:
identifying the gray level associated with the first color value comprises determining a ratio of a first distance from the first color value to the second boundary to a second distance from the first boundary to the second boundary, the first and second distances determined based on the first color value and a value determined from the color value from an intersection of extrapolations of the third and fourth boundaries; and
identifying the saturation level associated with the first color value comprises determining a ratio of a third distance from the first color value to the fourth boundary to a fourth distance from the third boundary to the fourth boundary, the third and fourth distances determined based on the first color value and a value determined from the color value from an intersection of extrapolations of the first and the second boundaries.

14. The method of claim 13, wherein determining the black component value in the second color space comprises using the identified gray level, the identified saturation level, and a chroma start value.

15. The method of claim 13, wherein the chroma start value is a constant or based on the hue component.

16. A computer program product, encoded on a non-transitory computer-readable storage medium, operable to cause data processing apparatus to perform operations comprising:
receiving a first color value in a first color space for conversion to a second color value in a second color space, the first color value comprising a luminance component, a chroma component, and a hue component, the second color value comprising a black component and a plurality of color components;
identifying a limit of a color gamut in the second color space, at least a portion of the limit based on the hue component;
determining a plurality of boundaries in the first color space corresponding to the identified limit of the color gamut;
identifying a gray level and a saturation level associated with the first color value based on a relationship of the luminance component and the chroma component and the plurality of boundaries;
determining a black component value in the second color space using the identified gray level and the identified saturation level; and
determining the second color value in the second color space corresponding to the first color value in the first color space using the black component value and the first color value in the first color space.

17. The product of claim 16, wherein:
at least a portion of the limit corresponds to a range of color values representing a substantially darkest portion of the color gamut;
at least a portion of the limit corresponds to a range of color values representing a substantially lightest portion of the color gamut;
at least a portion of the limit corresponds to a range of color values representing a substantially most saturated portion of the color gamut;
at least a portion of the limit corresponds to a range of color values representing a substantially least saturated portion of the color gamut;
the plurality of boundaries comprises a first boundary in the first color space corresponding to color values in the second color space associated with the range of color values representing the substantially darkest portion of the color gamut, a second boundary in the first color space corresponding to color values in the second color space associated with the range of color values representing the substantially lightest portion of the color gamut, a third boundary in the first color space corresponding to color values in the second color space associated with the range of color values representing the substantially most saturated portion of the color gamut, and a fourth boundary in the first color space corresponding to color values in the second color space associated with the range of color values representing the substantially least saturated portion of the color gamut; and
identifying the gray level and the saturation level associated with the first color value comprises identifying the gray level and the saturation level based on a relationship of the luminance component and the chroma component to the first, second, third, and fourth boundaries.

18. The product of claim 17, wherein:
identifying the gray level associated with the first color value comprises determining a ratio of a first distance from the first color value to the second boundary to a second distance from the first boundary to the second boundary, the first and second distances determined based on the first color value and a value determined from the color value from an intersection of extrapolations of the third and the fourth boundaries; and
identifying the saturation level associated with the first color value comprises determining a ratio of a third distance from the first color value to the fourth boundary to a fourth distance from the third boundary to the fourth boundary, the third and fourth distances determined based on the first color value and a value determined from the color value from an intersection of extrapolations of the first and the second boundaries.

19. A system comprising:
a memory operable to store a first electronic document comprising a plurality of color values in a first color space and a second electronic document comprising a plurality of color values in a second color space; and
a processor communicatively coupled to the memory operable to:
receive a first color value in the first color space for conversion to a second color value in the second color space, the first color value comprising a luminance component, a chroma component, and a hue component, the second color value comprising a black component and a plurality of color components;
identify a limit of a color gamut in the second color space, at least a portion of the limit based on the hue component;
determine a plurality of boundaries in the first color space corresponding to the identified limit of the color gamut;
identify a gray level and a saturation level associated with the first color value based on a relationship of the luminance component and the chroma component and the plurality of boundaries;
determine a black component value in the second color space using the identified gray level and the identified saturation level; and
determine the second color value in the second color space corresponding to the first color value in the first color space using the black component value and the first color value in the first color space.

20. The system of claim 19, wherein:
at least a portion of the limit corresponds to a range of color values representing a substantially darkest portion of the color gamut;
at least a portion of the limit corresponds to a range of color values representing a substantially lightest portion of the color gamut;
at least a portion of the limit corresponds to a range of color values representing a substantially most saturated portion of the color gamut;
at least a portion of the limit corresponds to a range of color values representing a substantially least saturated portion of the color gamut;
the plurality of boundaries comprises a first boundary in the first color space corresponding to color values in the second color space associated with the range of color values representing the substantially darkest portion of the color gamut, a second boundary in the first color space corresponding to color values in the second color space associated with the range of color values representing the substantially lightest portion of the color gamut, a third boundary in the first color space corresponding to color values in the second color space associated with the range of color values representing the substantially most saturated portion of the color gamut, and a fourth boundary in the first color space corresponding to color values in the second color space associated with the range of color values representing the substantially least saturated portion of the color gamut; and
the processor is further operable to identify the gray level and the saturation level based on a relationship of the luminance component and the chroma component to the first, second, third, and fourth boundaries.

21. The system of claim 19, wherein the first electronic document comprises a Portable Document Format document.

22. The system of claim 20, wherein the processor is further operable to:
determine a ratio of a first distance from the first color value to the second boundary to a second distance from the first boundary to the second boundary, the first and second distances determined based on the first color value and a value determined from the color value from an intersection of extrapolations of the third and the fourth boundaries; and
determine a ratio of a third distance from the first color value to the fourth boundary to a fourth distance from the third boundary to the fourth boundary, the third and fourth distances determined based on the first color value and a value determined from the color value from an intersection of extrapolations of the first and the second boundaries.

* * * * *